L. G. COPEMAN.
TOASTER.
APPLICATION FILED OCT. 31, 1919.

1,347,013. Patented July 20, 1920.

Inventor
Lloyd G. Copeman
By Stuart L. Barnes
Attorney

UNITED STATES PATENT OFFICE.

LLOYD G. COPEMAN, OF FLINT, MICHIGAN.

TOASTER.

1,347,013.  Specification of Letters Patent.  Patented July 20, 1920.

Application filed October 31, 1919. Serial No. 334,739.

*To all whom it may concern:*

Be it known that I, LLOYD G. COPEMAN, a citizen of the United States, residing at Flint, in the county of Genesee and State of Michigan, have invented certain new and useful Improvements in Toasters, of which the following is a specification.

This invention relates to toasters and has for its object a toaster that is provided with a pair of grids which can be very easily assembled in place and which can be readily removed from their normal positions to clean the toaster.

In toasters of the vertical type it is very often hard to get in under the grids to clean the crumbs or dirt off from the table portion of the base. Some thin instrument like a knife or spatula is ordinarily necessary to get under the grids which come fairly close to the table portion of the base. It is the object of the present invention to provide a toaster which has a pair of grids which can be swung to remove them from proximity with the top of the base so access can be freely had to the same. This will more fully appear in the drawings and in the specific description following.

In the drawings,—

$a$ designates the base, $b$ the heating element, $c$, $c$ the end supports, and $d$ the top of the toaster. The toaster here shown is what is known as a "turn-over" toaster, that is to say, the pivoted grid $e$ can be swung down and the extensions $f$ will kick in under the bread that has been toasted on one side and will cause it to slide down these extensions $f$ and reverse itself. This is fully described and claimed in some of my prior patents and is broadly claimed in a prior patent to Wiltsie. In a toaster of this description these grids come relatively close to the table portion or top of the base. Any one who has used a toaster is familiar with the great amount of crumbs that always collect, and it has been found very difficult to clean these toasters because of the inability to get in between the grids and the table portion of the base. It is also somewhat difficult to assemble a toaster of this description. Heretofore the rod $g$ of the outer pivoted grid has been made with reduced end portions that are screw-threaded and the knobs $h$ have been screwed on to these threaded portions after the perforated end supports $c$ have been distorted sufficiently to spring them over the reduced threaded end portions of the rod $g$.

Instead of such a construction, the bearing recesses of the end supports are slotted as at $i$. These are adapted to receive the rod $g$ of the outer grid. A latch $j$ with a recess $k$ whose major axis is substantially at right angles to the major axis of the recess $i$ when the two recesses overlap is adapted to be swung over the recess $i$. The two overlapping recesses form really a perforation. These latches $j$ are tightly pivoted to the end supports so that they have considerable friction therewith to hold them in any given position of adjustment.

Figure 1:
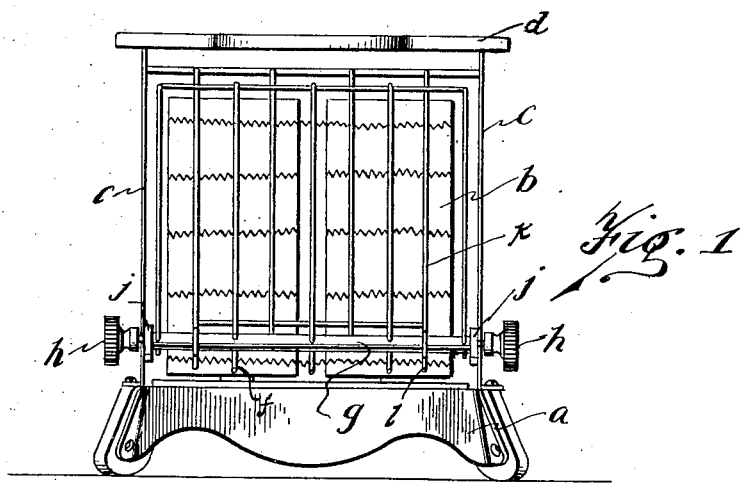
Figure 1 is a side elevation of the toaster.
Figure 2:
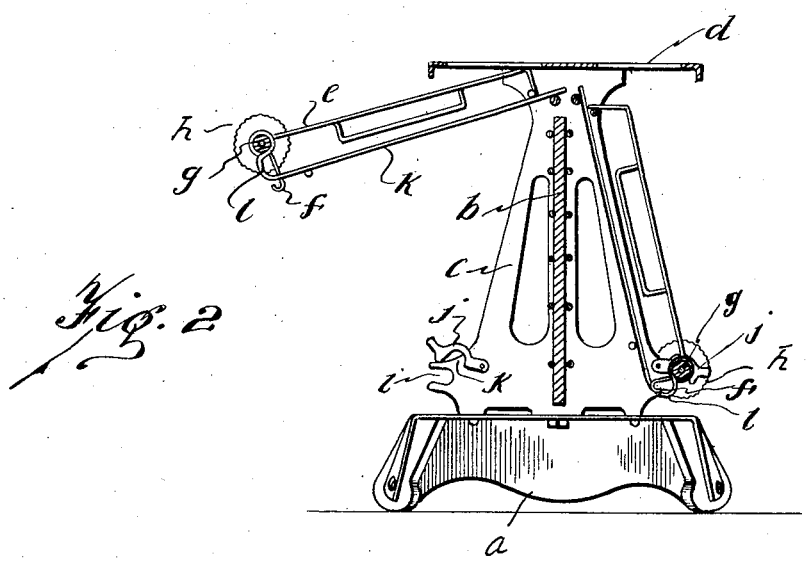
Fig. 2 is a vertical cross section of the same.

The inner grid $k$ is pivoted at its top to the end walls $c$, $c$ simply by placing the reduced end portions therethrough in the customary way; but some of the downwardly running rods of the inner grid have loops or extensions $l$ at their bottoms which are adapted to loop over the pivoted rod $g$ of the outer grid but allow the outer grid to turn in these loops as bearings. Consequently when the latches $j$ are released as shown at the left of Fig. 2, the two grids may be swung up in the position there shown simply on the top pivot of the inner grid in the end supports, or for that matter, the two grids may be very easily removed by simply slightly springing the end supports to withdraw the reduced portions of the top cross rod of the inner grid therefrom. Either operation freely exposes the table portion or top of the base for cleaning.

What I claim is:

1. In a toaster, the combination of a base, a pair of end supports, an inner grid movably secured to the end supports at its top, an outer grid pivotally supported by the inner grid, and means for releasably holding the said two grids in their normal position for service.

2. In a toaster, the combination of a base, a heating element, a pair of end supports, a pair of grids, the inner of which is pivotally supported at its top to the end supports, the outer of which is pivotally connected with the inner grid, and means for pivotally but releasably supporting the outer grid in the end supports.

3. In a toaster, the combination of a base, a heating element, a pair of supports, means for movably supporting the inner grid in the said supports, the outer grid pivotally connected with the inner grid, and means for releasably supporting the two grids in position for service.

4. In a toaster, the combination of a base, a pair of supports, a heating element, a pair of grids pivotally connected together but adapted to be moved as a unit when desired, and means for releasably holding them in position for service.

5. In a toaster, the combination of a base, a heating element, a pair of supports, and a pair of grids, the inner one of which is pivotally supported at its top and the outer one of which is pivotally supported by the inner one, and a releasable bearing for the cross rod of the outer grid.

6. In a toaster, the combination of a base, a pair of end uprights provided with slotted bearing recesses, a pair of grids movably supported at the top of the end supports and pivoted together at the bottom, the said outer grid being also pivotally supported in the slotted bearing recesses of the end supports, and latches which may be moved over a portion of the outer grid to hold the grids releasably in the said slotted bearing recesses of the end supports.

7. In a toaster, the combination of a base, a heating element, a pair of grids connected together as a unit, one of which is pivoted with respect to the other and both of which may be removably held in position of service by the end supports so that the same may be moved to clean the base when desirable.

In testimony whereof I affix my signature.

LLOYD G. COPEMAN.